United States Patent [19]

Kamata

[11] Patent Number: 4,759,618
[45] Date of Patent: Jul. 26, 1988

[54] ZOOM LENS MOUNTING

[75] Inventor: Shigeru Kamata, Tokyo, Japan

[73] Assignee: Canon Kabushiki Kaisha, Tokyo, Japan

[21] Appl. No.: 816,374

[22] Filed: Jan. 6, 1986

[30] Foreign Application Priority Data

Jan. 11, 1985 [JP] Japan ................................. 60-003031

[51] Int. Cl.$^4$ ............................................. G02B 7/10
[52] U.S. Cl. ................................................ 350/429
[58] Field of Search ....................... 350/429, 430, 563; 354/195.11, 286

[56] References Cited

U.S. PATENT DOCUMENTS 4,472,032 9/1984 Kamata et al. ....................... 350/429

4,491,396 1/1985 Isobe et al. ........................... 350/429

FOREIGN PATENT DOCUMENTS 58-42443 9/1983 Japan .

Primary Examiner—John K. Corbin
Assistant Examiner—Loha Ben
Attorney, Agent, or Firm—Toren, McGeady & Associates

[57] ABSTRACT

A lens mounting having an actuator drivingly connected to a movable sleeve in which is fitted a stop member for controlling harmful rays of light, whereby a cam for controlling the axial movement of the stop member is provided in each of the movable sleeve and a fixed sleeve in which the movable sleeve is fitted.

6 Claims, 2 Drawing Sheets

ZOOM LENS MOUNTING

BACKGROUND OF THE INVENTION

1. Field of the Invention

This invention relates to a lens mounting, and, more particularly, to a mechanical mounting for a zoom lens with a stop for cutting off harmful rays of light.

2. Description of the Prior Art

The shortening of the longitudinal physical length of a zoom lens optical system, or the reducing of its lateral length for minimization of the bulk and size of the lens, leads to a production of flare with a portion of the rays emerging from the zoom lens optical system. To eliminate this flare, a stop may be used and is arranged in rear of the zoom lens system to cut off those of the emerging rays which are responsible for the flare as is known in Japanese Laid-Open Patent Application No. SHO 56-66809 (corresponding to Japanese Patent Publication No. SHO 58-42443) wherein a mounting mechanism for a 2-component zoom lens is shown having a zoom ring drivenly connected through cam members to axially move the front and rear components, wherein a stop member is positioned in a space between a lens holder for the rear component and a rear cover fixedly mounted to the body tube to be axially moved in response to movement of the lens holder for the rear component, thereby the harmful rays causing the flare are cut off.

SUMMARY OF THE INVENTION

The present invention has for its general object to provide a novel structure of construction of the aforesaid flare-cut stop member for the zoom lens optical system, and particularly of a moving mechanism therefor.

In particular, since the lens mountings are manufactured at a reduced cost, and their unit weight is reduced, molding techniques with the use of resin material have recently found use in making up constituent members of the mounting. Hence, as the flare-cut stop member is made of synthetic resin, the invention is to provide a structure of construction of means for moving the stop member in response to zooming movement, which is amenable to the molding production techniques.

Further, the present invention is to provide a novel arranging relationship between the structure of construction of the zoom lens mounting and the flare-cut stop member.

In more detail, there are many ways in which the zoom lens mountings are operated, namely, the 2-ring method which has two actuating members, or the focusing ring and zoom ring, in separation, and the 1-ring method which is to perform focusing and zooming by a common actuator. In the case of the 1-ring method, the focusing and magnification adjustment can be made as a continuous operation. It is, therefore, another object of the invention in the structure of the zoom lens mounting, to provide a moving mechanism suited to the stop member for cutting off harmful rays of light causing flare or the like.

BRIEF DESCRIPTION OF THE DRAWINGS

FIG. 1 is a longitudinal section view of an arrangement of the constituent elements of a zoom lens mounting in the wide angle end.

FIG. 2 is similar to FIG. 1 except that the telephoto end is illustrated.

FIG. 3 is a perspective view of the drive connection member 20.

DETAILED DESCRIPTION OF THE PREFERRED EMBODIMENT

Figure 1:
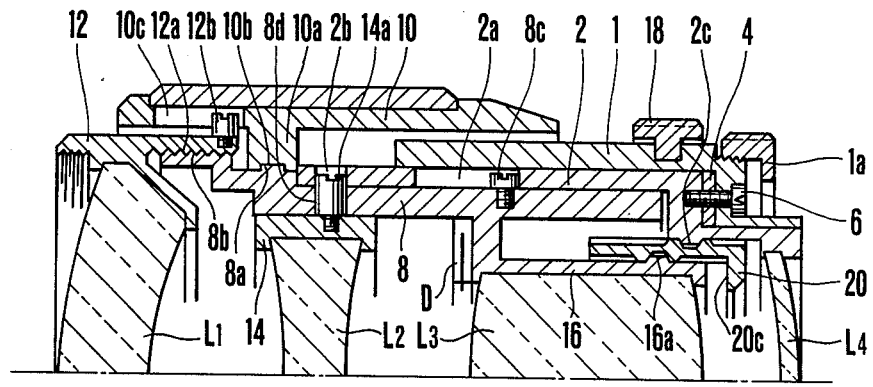
FIGS. 1 to 3 illustrate an embodiment of the invention.
Figure 2:
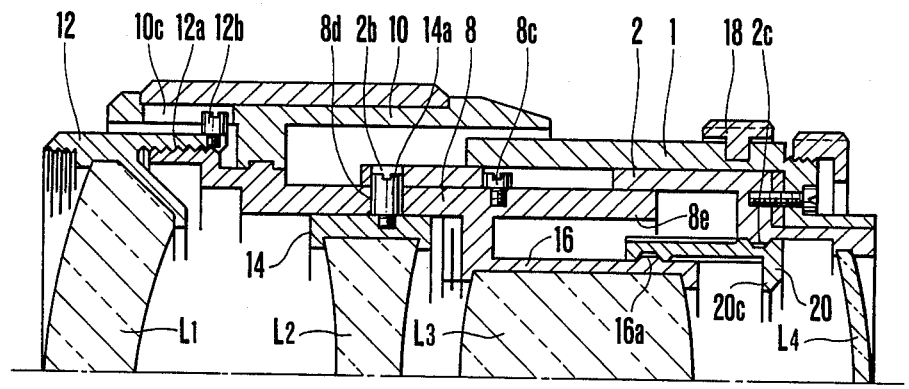
Figure 3:
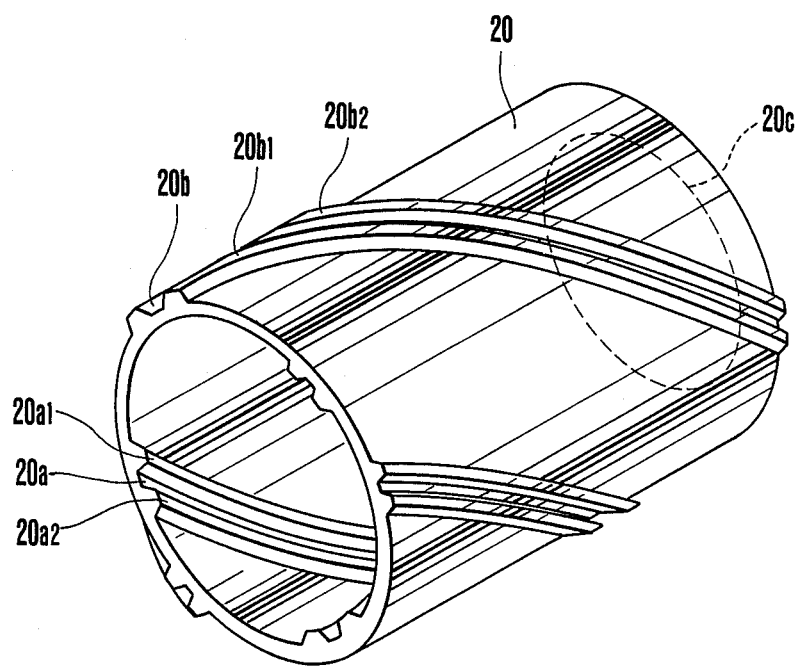

In the drawings, a body tube 1 has a coupling member (bayonet ring) 1a in the rear end thereof to engage with another coupling member which is on a camera housing (not shown). A stationary sleeve 2 is fitted in the inner diameter of the body tube 1 in fixedly secured relation by a screw fastener 6 through a spacer 4, and is provided with a longitudinally elongated slot 2a and an arcuate slot 2b. A movable sleeve 8 is fitted in the inner diameter of the stationary sleeve 2 and is drivenly connected to an actuator ring 10 fitted on the outer diameter of the body tube 1. A drive connection between the actuator 10 and the movable sleeve 8 may take either of the form, that of a radial arm extending from the ring 10 inwardly into one of the valleys of a helicoid of minute pitch provided in the outer surface of the movable sleeve 8 and that of an upward radial protuberance 8a on the outer surface of the movable sleeve 8 engaging in a circumfererential groove 10b in the end surface of the arm 10a, and has a function of transmitting axial movement of the actuator 10 to axially move the sleeve 8, while allowing for rotation of the actuator 10 alone about the optical axis, leaving the sleeve 8 stationary.

The outer surface of the front end portion of the movable sleeve 8 is provided with a helicoid portion 8b in mesh with another helicoid portion 12a of a hold member 12 containing a focusing or first lens component L1. A pin 12b fixedly mounted on the outer surface of the hold member 12 engages in a groove 10c of the actuating member 10.

Another pin 8c is mounted on the outer surface of the movable sleeve 8, engaging in the linear slot 2a of the stationary sleeve 2 to restrain the movable sleeve 8 from rotation.

L2 is a second lens component as the variator lens, and a lens holder 14 for said component L2 is fitted in the inner diameter of the movable sleeve 8. A pin 14a extends radially outwardly of the holder 14 through a camming slot 8d of the movable sleeve 8 and projects therefrom into the arcuate slot 2b of the stationary sleeve 2.

L3 is a third lens component as the compensator, and a lens holder 16 for that component L3 is fixedly secured to the movable sleeve 8.

A diaphragm unit D is held inside the movable sleeve 8 and cooperates with a diaphragm ring 18 to control the size of an aperture opening.

L4 is a fourth lens, component as the relay lens fixedly mounted to the stationary sleeve 2.

20 denotes a control member for a stop for cutting the harmful rays of light causing flare or the like.

The stop control member 20 for the stop is formed to a cylindrical shape whose inner and outer surfaces each are provided with three camming grooves 20a and 20b, respectively for controlling the movement of the member 20 for the stop.

The camming grooves 20a and 20b each are flanked by a pair of helical flanges 20a1 and 20a2, 20b1 and 20b2.

The stop control member 20 is arranged between the lens holder 16 and the stationary sleeve 2. On the outer surface of the lens holder 16 there is provided a cam follower, in the form of a projection 16a, engaging in the camming groove 20a on the inner surface of the stop control member 20. On the inner surface of the sleeve 2 there is provided a cam follower, in the form of a projection 2c, engaging in the camming groove 20b on the outer surface of the stop control member 20.

The operation of the zoom lens mounting of such construction is as follows: The actuating member 10, upon rotation about the optical axis, performs the focusing function, and, upon axial movement, performs the zooming function. When the actuating member 10 turns, the focusing lens holder 12, while being rotated, is axially moved by the engaging relationship of the groove 10c and the pin 12b to effect focusing. During this time, the movable sleeve 8 is held stationary. When the actuating member 10 moves axially for zooming purposes, the movable sleeve 8 is moved in unison with the actuating member 10.

By the movement of the movable sleeve 8, the variator lens L2 is moved by the pin 14a as the cross point of the cams 8d and 2b moves, taking a prescribed locus of movement.

The third lens component L3, due to it being directly fixed to the movable sleeve 8, moves the same distance as that the movable sleeve 8 moves, taking a prescribed locus of movement.

During the time when the actuator 10 is being zoomed, because the first lens component L1 is drivenly connected to the movable sleeve 8 by the helicoid mechanism 8b, 12a, it is moved along with the movable sleeve 8. Therefore, when zooming, all the lens components except the relay lens L4 are moved axially in prescribed differential relation to effect zooming.

As the movable sleeve 8 moves axially by the zooming operation of the actuator 10, motion of the sleeve 8 is transmitted through the cam follower 16a to rotate the stop control member 20. Rotation of the stop control member 20 is reflected by the camming groove 20b-and-cam follower 2c connection to axial movement thereof relative to the stationary sleeve 2 by a corresponding distance to the amount of rotation.

The stop control member 20 is installed in such a way as to be put on the free end of the lens holder 16 from the outside thereof, and is constructed together with a flanged portion 20c radially inwardly extending from the rear or free end of the cylindrical portion of the stop control member 20.

When zooming from the telephoto end to the wide angle end, the stop control member 20 moves axially rearward while its distance from the third lens component L3 is varied depending upon the lead of the camming grooves 20a and 20b, so that the harmful rays of light emerging from the third lens component L3 are cut off by the flanged portion 20c.

According to the invention, the use of a synthetic plastic material in making up the harmful ray-cut stop member 20 by the molding technique, provides an improvement of the accuracy of the camming portions of the stop control member 20. Further, as has been shown in the embodiment, the cam means 20a and 20b, not in the form of slots across the entire thickness of the cylinder, but in the form of grooves with bottom walls can be easily constructed. Because of the presence of the bottom walls, the inner and outer cam means may be crossed over with an advantage of shortening the axial length of the stop control member 20.

In the relationship between the camming grooves 20a and 20b and the cam followers 16a and 2c for moving the stop member 20, all the members constituting the cam followers 16a and 2c (the lens holder 16, or movable sleeve 8, stationary sleeve 2) and the stop member 20 when formed by the molding means produce advantages that as compared with the conventional cam follower means, for example, a pin fixedly mounted on the lens holder 16 together with a roller between the pin and the camming slot, the number of assembled parts is reduced, and the possibility of occurrence of deformation of the pin or of faulty rotation of the roller, due to the aging of these parts in use after the completion of their assembling and the application of excessive external force thereto, is reduced to zero, so that smooth movement of the stop member 20 can be insured for a far longer time.

Another advantage of the invention, arising from the use of an arrangement of the helical cams on both of the inner and outer surfaces of the cylindrical member, is that it is convenient to put the harmful ray-cut stop member in between the movable sleeve for the zoom component and the stationary sleeve. That is, since the mounting mechanism has a superimposed form of a plurality of tubular members, for example, the stationary sleeve 2 on the movable sleeve 8, if the conventional cam follower means comprising the pin and roller is used, a space which the conventional cam follower means occupies, would be created, involving an increase in the diameter of the mounting.

The present invention has a feature that cams can be formed on the inner and outer surfaces of the cylindrical member in unified relation by the molding technique, and, therefore, produce an advantage that the stop member can be arranged even in a very narrow space between the lens holder 16 and the stationary sleeve 2 as shown in the embodiment thereof. It is also possible to modify the embodiment of FIG. 1 in such a way that the rear end of the movable sleeve 8 is extended so that the stop member takes its place between the extended portion 8e and the stationary sleeve 2.

Another feature of the invention is that the camming grooves 20a and 20b and the cam followers 16a and 2c, constituting the moving means for the stop member 20, have their side walls made inclined to facilitate an easiness of production when molding. This feature produces another advantage that smoothness of movement of the stop member 20 can be ensured.

What is claimed is:

1. A lens mounting unit comprising:
 (a) a body tube;
 (b) an optical member having at least a first lens group at a front side and a second lens group at a rear side;
 (c) an actuating member supported movably relative to said body tube;
 (d) a lens holding member for holding said second lens group, said lens holding member being arranged inside said body tube and movable in a direction of an optical axis by an operation of said actuating member;
 (e) a stop member for controlling a diameter of a light flux passing through said first and second lens groups, said stop member having a cylindrical portion whose outer periphery is opposite to said body tube and inner periphery is opposite to said lens holding member; and (f) guide means for moving said stop member in the direction of the optical axis along with movement of said lens holding member in the direction of the optical axis, said guide means including first cam means provided between said cylindrical portion of said stop member and said body tube, and second cam means provided between said cylindrical portion of said stop member and said lens holding member, said cylindrical portion of said stop member having a cam groove formed on an outer peripheral surface thereof for engagement with said first cam means, and a second cam groove formed on an inner peripheral surface thereof for engagement with said second cam means, said first and second cam grooves being formed starting from at least one end of said cylindrical portion in the direction of the optical axis.

2. A lens mounting unit according to claim 1, wherein said second lens group is for zooming.

3. A lens mounting unit according to claim 1, wherein said stop member is formed of synthetic resin so as to integrally form said cam grooves, for engagement with said first and second cam means, on the outer peripheral surface and inner peripheral surface of said stop member.

4. A lens mounting unit according to claim 1, wherein said first cam means comprises a first cam follower to be inserted into the first cam groove formed on the inner peripheral surface of said body tube, and said second cam means comprises a second cam follower to be inserted into the second cam groove formed on the outer peripheral surface of said lens holding member.

5. A lens mounting unit according to claim 4, wherein said first cam groove and said second cam groove have mutually overlapping portions which overlap in a direction transverse to the optical axis.

6. A lens mounting unit according to claim 4, wherein said first and second cam followers and said first and second cam grooves each have, respectively, a slanted side wall.

* * * * *